United States Patent
Ledroit et al.

Patent Number: 5,691,849
Date of Patent: Nov. 25, 1997

[54] REAR-VIEW ASSEMBLY FOR A VEHICLE AND AN ADAPTOR THEREFOR

[75] Inventors: René Ledroit, Les Bons Villers; Jean-François Thomas, Braine-le-Château; André Hecq, Nalinnes, all of Belgium

[73] Assignee: Glaverbel, Brussels, Belgium

[21] Appl. No.: 198,769

[22] Filed: Feb. 18, 1994

[30] Foreign Application Priority Data

Feb. 25, 1993 [GB] United Kingdom ............ 93 03 807.3

[51] Int. Cl.$^6$ .............................. G02B 27/00; G02B 5/08; G02B 7/182

[52] U.S. Cl. ............. 359/603; 359/601; 359/606; 359/607; 359/608; 359/605; 359/604; 359/871; 359/872; 248/490; 248/491; 248/493

[58] Field of Search ........................ 359/608, 607, 359/606, 605, 604, 603, 601, 871, 872, 877, 602; 248/490, 491, 493, 495, 496, 497, 346.04

[56] References Cited

U.S. PATENT DOCUMENTS

| | | | |
|---|---|---|---|
| 3,650,606 | 3/1972 | Noord | 359/607 |
| 3,655,267 | 4/1972 | Forlini | 359/253 |
| 3,680,951 | 8/1972 | Jordan et al. | 359/606 |
| 4,216,933 | 8/1980 | Cramer | 248/346.06 |
| 4,457,586 | 7/1984 | Sharp et al. | 359/603 |
| 4,701,022 | 10/1987 | Jacob | 359/603 |
| 4,747,570 | 5/1988 | Takahashi | 248/346.04 |
| 4,883,918 | 11/1989 | Browning | 248/346.06 |
| 4,948,242 | 8/1990 | Desmond et al. | 359/606 |
| 5,073,012 | 12/1991 | Lynam | 359/603 |
| 5,076,674 | 12/1991 | Lynam | 359/603 |
| 5,115,346 | 5/1992 | Lynam | 359/603 |

FOREIGN PATENT DOCUMENTS

| | | |
|---|---|---|
| 173309A3 | 3/1986 | European Pat. Off. . |
| 426503A1 | 5/1991 | European Pat. Off. . |
| 496155A3 | 7/1992 | European Pat. Off. . |
| 571098A1 | 11/1993 | European Pat. Off. . |
| 824930 | 2/1938 | France . |
| 1012237 | 7/1952 | France . |
| 2366958 | 5/1978 | France . |
| 60-104921 | 6/1985 | Japan . |
| 60-130716 | 7/1985 | Japan . |
| 60-177301 | 9/1985 | Japan . |
| 61-246720 | 11/1986 | Japan . |
| 5286393 | 2/1994 | Japan . |
| 2115573 | 9/1983 | United Kingdom . |

*Primary Examiner*—Paul M. Dzierzynski
*Assistant Examiner*—Mohammad Y. Sikder
*Attorney, Agent, or Firm*—Spencer & Frank

[57] ABSTRACT

A rear-view assembly for a vehicle includes a mirror and an anti-dazzle adaptor which is movably mounted in front of the mirror and which includes an optical cell having at least one electrically adjustable luminous characteristic selected from the group consisting of transmissivity and reflectivity. The anti-dazzle adaptor for a rear-view device of a vehicle includes an optical cell having at least one electrically adjustable luminous characteristic selected from the group consisting of transmissivity and reflectivity; and means for movably mounting the anti-dazzle adaptor on the rear-view device of the vehicle.

32 Claims, 5 Drawing Sheets

REAR-VIEW ASSEMBLY FOR A VEHICLE AND AN ADAPTOR THEREFOR

BACKGROUND OF THE INVENTION

1. Field of the Invention

The present invention relates to a rear-view assembly for a vehicle and an adaptor for forming such an assembly.

Rear-view devices of vehicles, whether interior or exterior, are usually based on reflection. Anti-dazzle devices, called "prismatic" rear view devices, have a "day" position and a "night" position. In the day position the degree of luminous reflectivity from the device is high, generally higher than 50%. In the night position, the reflectivity is limited to 10% or less, such as about 4%, in order to avoid dazzling of the driver by lights, for example the headlights of other vehicles. The driver of the vehicle has to manually change the position of the device from the day position to the night position and vice versa.

2. Description of the Related Art

Another day/night rear-view device is known from French patent specification FR 824 930 (M Billon). This document discloses a "night" mirror, which may be folded with the aid of a hinge over a "day" mirror. The night mirror is formed with a coloured substrate joined to the reflective surface.

Transferring a mirror from night-time to day-time operation by manual tilting, as described in French patent specification FR 824 930, referred to above, is fail-safe, but is inconvenient because it is necessary to tilt the mirror each time its status is to be changed.

It is known, for example from French patent specification FR 2 366 958 (Brisard Gerard), to construct a rear-view device in which the reflectivity varies as a function of the degree of dazzle. This variation may be simply of the "all or nothing type" or on the other hand, may be continuous, for 26 example leading to a reflectivity varying between 4% and 80%. The variation in reflectivity may be achieved manually or entirely automatically by way of a suitable electronic circuit.

These rear-view devices comprise an optical cell (also called a light valve) in which reflectivity varies as a function of an electrical signal. Various techniques allow the production of such cells, in particular suspended particles, electrochromism, electrodeposition and liquid crystal technology. Such an optical cell may be formed by sandwiching a layer of sensitive material between sheets of rigid, generally transparent material.

In the case of electrical, electronic or other breakdown, in the case of the electrical system of the vehicle being switched off, or in the case of over-excitation of the optical cell, this type of rear-view device may be temporarily or permanently switched into its darkest state (the least reflectivity) even in full daylight and this can constitute a problem of discomfort or lack of safety for the driver, who in the most extreme case is deprived of rearward vision. For example, where the cell is of the type which is clear at rest and opaque when activated by an electric current, as is the case with some liquid crystal, electrodeposition or electrochromic cells, the erroneous continuous application of electrical current to the cell even in full daylight, due to some failure of the electronic control, results in the cell being in its dark state leading to problems of discomfort or lack of safety for the driver.

SUMMARY OF THE INVENTION

The object of the present invention is to provide a rear-view device with variable reflectivity or transmissivity, which continually assures correct functioning of rearward vision, even in the case of breakdown of the variable reflectivity or transmissivity function.

According to a first aspect of the invention, there is provided a rear-view assembly for a vehicle, characterised in that it comprises a mirror and an anti-dazzle adaptor movably mounted in front of the mirror, the adaptor comprising an optical cell having electrically adjustable luminous transmissivity and/or reflectivity characteristics.

According to a second aspect of the invention, there is provided an anti-dazzle adaptor for a rear-view device of a vehicle, characterised in that the adaptor comprises an optical cell having electrically adjustable luminous transmissivity and/or reflectivity characteristics and means for movably mounting the adaptor on a rear-view device of a vehicle.

The invention thus enables the user to place an optical cell having adjustable luminous transmissivity or reflectivity in a movable position in front of the usual rear-view device which will usually incorporate an ordinary mirror or an emergency mirror having a substrate made of glass or a plastic material. The optical cell is movable out of the line of sight between the user and the mirror. In particular, we prefer that the optical cell be removably mounted on the housing of the usual rear-view device, in front of the mirror. When the optical cell becomes obscured in an undesired manner for any reason, it is sufficient to remove it to return to correct rearward vision, via the mirror of the usual rear-view device. The optical cell may then be repaired or replaced (or even not replaced) according to the choice of the user.

In preferred embodiments of the invention, therefore, the invention resides in the movable mounting of an optical cell having variable luminous transmissivity or reflectivity characteristics, in front of the mirror of a rear-view device, where the term "variable" includes not only all-or-nothing functioning but also continuous variation. The advantage achieved with the invention is that the variable luminous transmissivity or reflectivity characteristics allow an easy adjustment of the luminous reflectivity while the movability of the device provides a fail-safe property, for the comfort and safety of the driver.

The rear-view device may comprise a housing carried on the windscreen or roof of a vehicle, a conventional or emergency mirror being positioned within the housing. The optical cell may be carried in a movable support frame. The housing and the support frame may then be provided with co-operating releasable securing means. An electronic circuit for controlling the adjustment of the optical cell may be provided and this may be positioned in the housing, in the movable support frame or at least part of the electronic circuit for controlling the adjustment of the optical cell may be provided in the housing, and at least part of the electronic circuit for controlling the adjustment of the optical cell may be provided in the movable support frame. Co-operating electrical connection means may be provided on the housing and on the movable support frame. This is particularly useful, where power for adjusting the optical cell is derived from the electrical system of the vehicle. When the support frame is put in position on the housing, one obtains a rear-view device with adjustable luminous reflectivity. On moving the support frame out of the line of sight, one immediately obtains a traditional rear-view device. As a less preferred alternative, power for the cell may be derived from a battery located in the support housing.

The movable support frame may be fixed to the housing by any suitable means, such as clips on one member engaging in corresponding lugs on the other member, by a friction fit or by means of a tightening collar or any other temporary fixing means. Where the movable support frame is not removable, or in any case, the support frame may be fixed to the housing by means of one or more hinges or a slide, enabling the support frame to be respectively swung or slid out of the line of sight. The principle of movably fixing a support frame to the housing may equally be applied to exterior rear-view devices of a vehicle.

By preference, the optical cell has adjustable luminous reflectivity. In this manner the risk of multiple images is reduced.

The optical cell may be formed in part by a plastics material substrate. Thus, it is possible to form the cell with sheets of a plastics material, such as polyethylene terephthalate, carrying a conductive coating. It may however be difficult to maintain a constant spacing between the sheets of plastics material over the whole surface of the cell. If this spacing is not maintained within a tolerance of about 5 to 10 µm (for suspended particle technology—the tolerances are more strict for liquid crystal technology) the transparency of the cell is not uniform. We therefor prefer that the optical cell includes at least one sheet of glass, which may be plane or curved, and in particular the sensitive material of the optical cell is advantageously sandwiched between two sheets of glass, for the sake of rigidity. The inwardly directed faces of the sheets of glass may be coated with an electrically conductive material. Preferably, one of the faces of the sheets of glass is provided with a reflective coating. Where the optical cell comprises a layer of sensitive material sandwiched between two sheets of glass, the reflective coating may be provided on an outwardly directed face of one of the sheets. Alternatively, the reflective coating may be a reflective coating of electrically conductive material, provided on an inwardly directed face of one of the sheets.

The optical cell may be an electrochromic optical cell or a liquid crystal optical cell or an electrodeposition optical cell. In electrodeposition, the passage of a current through a transparent liquid containing a metallic salt causes the migration of metallic ions to the surface of the glass and the formation of a metallic coating which absorbs the light. The electrodes in this case are $SnO_2$ coatings. Liquid crystal optical cells, electrodeposition optical cells and electrochromic optical cells are generally transparent at rest, but the return to a state of clarity from an opaque excited state may take some time, even a matter of hours. In this case, the movable support of the device according to the invention may be moved out of the line of sight in order to maintain normal rearward vision. However, the switching speed of such optical cells may be relatively slow and manufacturing costs are relatively high. Thus, we prefer that the optical cell is an optical cell which incorporates a fluid suspension of minute particles dispersed therein capable of orientation by an electric field, such as described, for example, in U.S. Pat. No. 3,655,267 (Research Frontiers). These optical cells switch rapidly from a clear state to a dark state. They also provide a wide range of luminosity.

The variation in luminous transmissivity or reflectivity of the optical cell is preferably achieved automatically by an electronic circuit controlled by at least one photo-sensitive optical device which detects the incident light falling on the assembly. Advantageously, the electronic circuit is controlled by at least two light detection devices, the first being positioned to receive light coming from the rear of the vehicle and the second being positioned to receive light coming through the windscreen from the front of the vehicle or ambient light reflected by the roof of the vehicle or diffused by a transparent roof of the vehicle.

The electronic control for the optical cell may alternatively or additionally be manually operable, for example with the aid of a regulating potentiometer or a multi-position commutator. In such a multi-position commutator, each position places a different resistance into the electronic circuit in order to enable step-wise voltage variation. It is possible to control the electronic circuit partially or totally in a manual manner by placing on the housing or on the movable support frame a slider or knob allowing manual regulation of the level of reflection of the optical cell situated in the movable support frame and/or the speed of variation of the luminous reflectivity. This manual control may be combined or not with the automatic control connected to the light detection device(s).

Where, in addition to an internal rear-view assembly, one or more exterior rear-view assemblies are provided, the transmissivity and/or the reflectivity characteristics of the external rear-view assembly may be controlled by the same electronic circuit provided for the control of the internal rear-view assembly, to provide simultaneous adjustment of the transmissivity and/or reflectivity characteristics. In this case, the external rear-view assembly need not be provided with respective electronic circuits, but merely with suitable electrical connection means.

BRIEF DESCRIPTION OF THE DRAWINGS

The invention will now be further described, by way of example, with reference to the accompanying drawings in which.

DESCRIPTION OF THE PREFERRED EMBODIMENTS

Figure 1:
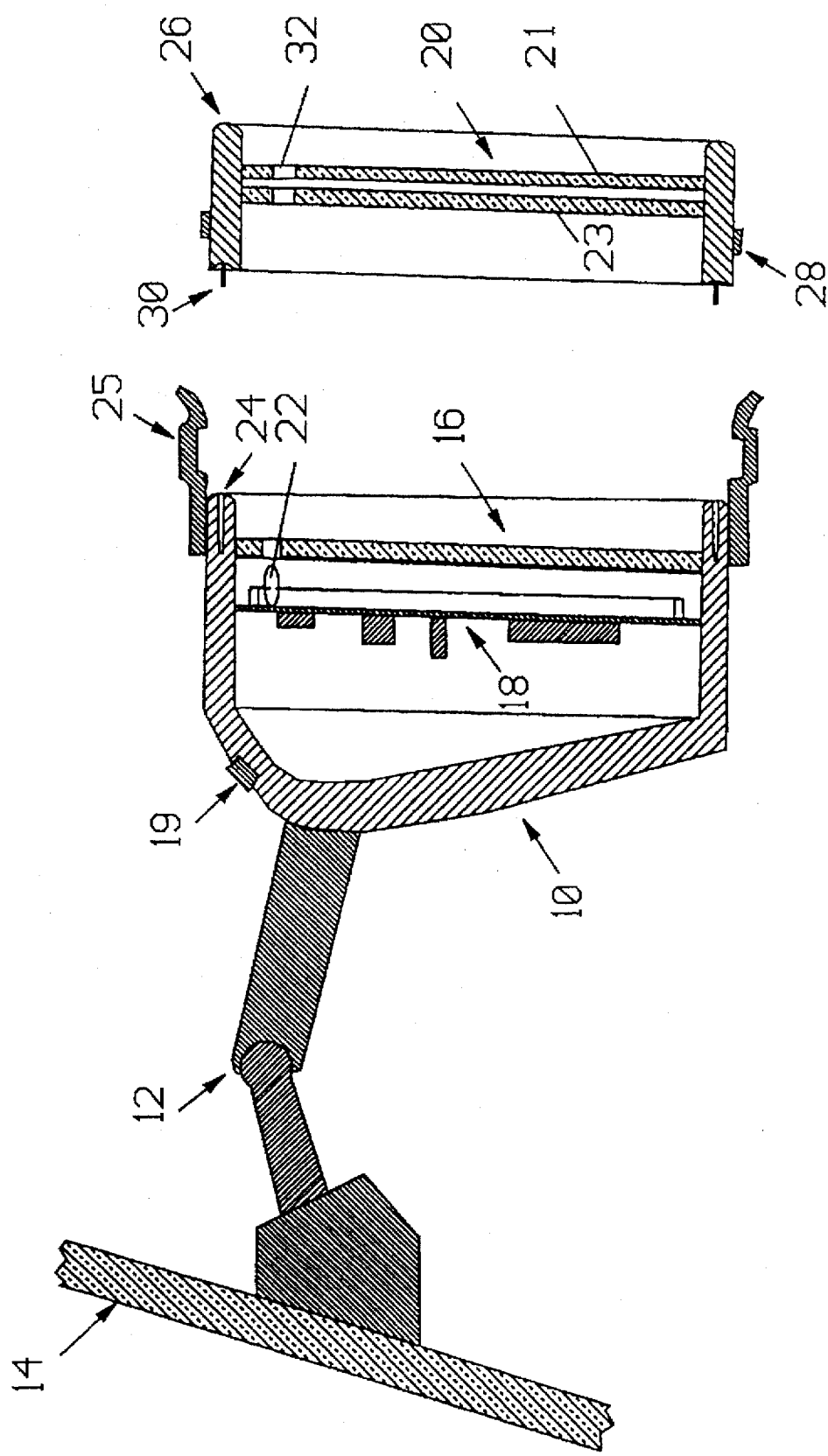
FIG. 1 shows diagramatically a cross-sectional exploded view of a first embodiment according to the invention.
Figure 4:
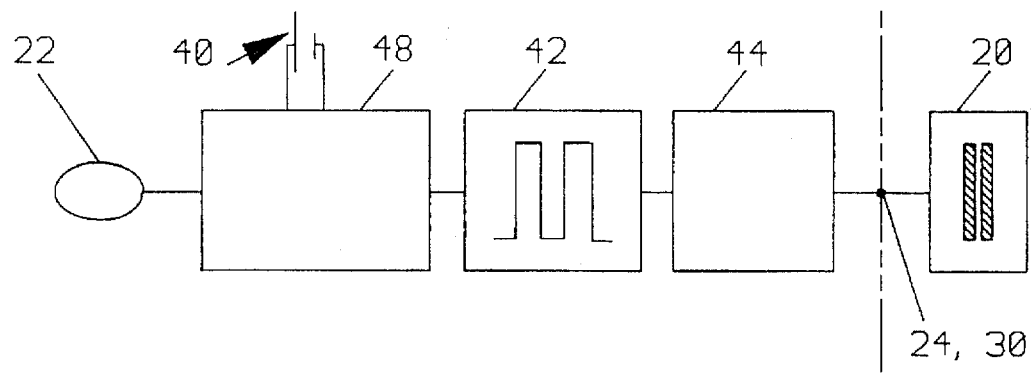
FIG. 4 shows schematically a suitable electronic scheme for the rear-view device shown in FIG. 1.

As shown in FIG. 1, a rear-view device comprises a housing 10 carried by way of a universal joint 12 on the windscreen 14 or roof of a vehicle. Within the housing 10 is positioned a conventional mirror 16 which closes the front face of the housing and provides the device with the function and appearance of a traditional rear-view device. As an alternative, the mirror may simply be an emergency mirror formed for example of a sheet of plastic material carrying a reflective coating. An electronic circuit 18 is provided in the interior of the housing 10, the circuit being capable of assuring electrical adjustment and the automatic control of an optical cell (light valve) 20. As shown in FIG. 4, discussed in more detail below, the electronic circuit 18 comprises a control circuit 48, a square wave generator 42 and a high tension transformer 44. As an alternative to the square wave generator, a sinusoidal signal generator may be used. The electronic circuit 18 is fed with electrical power from the electrical system of the vehicle via a terminal 19. The housing 10 is provided on its front face with a light detection device 22, positioned to measure dazzle by being directed to catch light from the rear of the vehicle. The housing 10 is also provided with electrical connector sockets 24 and with fixing lugs 25.

The housing 10 is coupled to a removable support frame 26 within which is carried a variable reflectivity mirror constituted by the optical cell 20. The support frame 26 carries lugs 28 which co-operate with fixing clips 25 (shown only in FIG. 1) on the housing 10, while the electrical connector plugs 30 assure contact with the connectors 24 of the housing 10 in a manner to ensure electrical control of the optical cell by the electronics contained in the housing 10.

When the support frame 26 is put in position on the housing one obtains a rear-view device with adjustable luminous reflectivity. On removing the support frame one immediately obtains a traditional rear-view device.

In the case of breakdown, one may maintain proper rearward vision in spite of the optical cell becoming obscured. The optical cell may easily be replaced after repair.

The optical cell 20 is formed by particles suspended in a fluid, according to the technology known from U.S. Pat. No. 3,655,267 (Research Frontiers), that is as a sandwich between two sheets of glass. The particles are such as to be capable of orientation by an electric field to change the transmission of light through the suspension. Fluid suspensions of herapathite in a suitable liquid such as iso-pentyl acetate are preferred, although other types of particles can be used, such as graphite, mica, garnet red, aluminium and periodides of alkaloid sulphate salts. The front glass sheet 21, positioned at the face of the optical cell, carries a coating of ITO (Indium Tin Oxide), which is conductive and transparent. The rear glass sheet 23, positioned at the interior of the optical cell, carries a conductive and reflective coating of aluminium. The rear glass sheet 23 is spaced from the front glass sheet 21 by spacers (not shown) to provide a sealed chamber having a depth of about 50 μm to contain the fluid suspension. One may equally use an optical cell of variable luminous transmissivity by replacing the reflective coating of aluminium on the rear glass sheet 23 with a conductive and transparent coating of ITO, similar to that used on sheet 21. In this case, it is the conventional mirror 16 situated in the housing 10 which assures reflection, which reflection is modified by the optical cell. Following the laws of optical geometry, one may sandwich between the housing and the support frame a medium having an index of refraction appropriate to avoid multiple reflections.

The electronic circuit supplies alternating current voltage of about 100V, which is applied to the conductive surfaces of the optical cell to generate an electrical field at the interior of the optical cell to orientate the particles in a manner to allow the passage of light through the optical cell. In order to vary the luminous reflectivity or transmissivity of the optical cell, it is sufficient to vary the current voltage applied to the optical cell. One may also vary the frequency, but this is less efficient. The variation in luminosity is largely proportional to the applied voltage up to a saturation limit. Without the influence of the electric field, the particles are subject to Brownian movement in the liquid and light does not pass easily through the optical cell. When the field is weak, the particles align themselves on average with the field, but they continue to oscillate about their mean position where absorption of a certain quantity of light occurs. It is necessary to reach a certain threshold value for the electric field, for example corresponding to a current voltage of about 100V, in order for the particles to be correctly aligned in the field and for no absorption of light to occur.

The automatic electronics of the embodiment shown in FIG. 1 are controlled by a light detection device 22 situated in the housing 10 to receive light from the rear of the vehicle. A small opening 32 in the surface of the optical cell 20 situated in the removable support frame 26 is treated in a manner to be at least partially devoid of reflection and to allow the passage of light coming from the rear of the vehicle towards the light detection device 22 situated in the housing 10.

One may equally control the electronics by means of two light detection devices, the first being the light detection device 22 situated as described above and the second (not shown) being situated at the rear of the housing 10 and directed in such a manner as to capture light from the front of the vehicle and/or light reflected/diffused by the roof.

Figure 2:
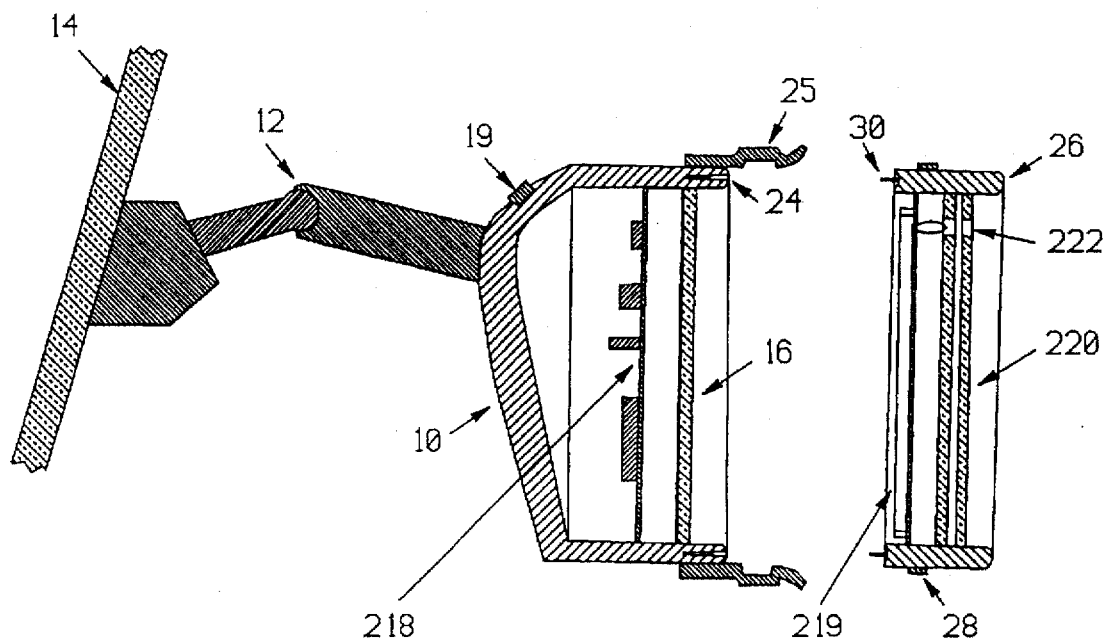
FIG. 2 shows diagramatically a cross-sectional exploded view of a second embodiment according to the invention.

In the embodiment of the invention shown in FIG. 2, those features in common with the embodiment shown in FIG. 1 are given identical reference numbers. The embodiment of FIG. 2 differs however in that the electronic circuit 18 is divided into two parts, a first part 218 being situated in the housing 10 and a second part 219 being situated in the removable support frame 26 to the rear of the optical cell. The second part 219 of the circuit comprises the high tension (100V) generator constructed in such a manner, for safety reasons, so as not to retain any high voltage when the support frame 26 is disconnected to the housing 10. As an alternative, an optical cell powered by low voltages only can be used.

The automatic electronics of the embodiment shown in FIG. 2 are controlled by a light detection device 222 situated in the removable support frame 26.

Figure 3:
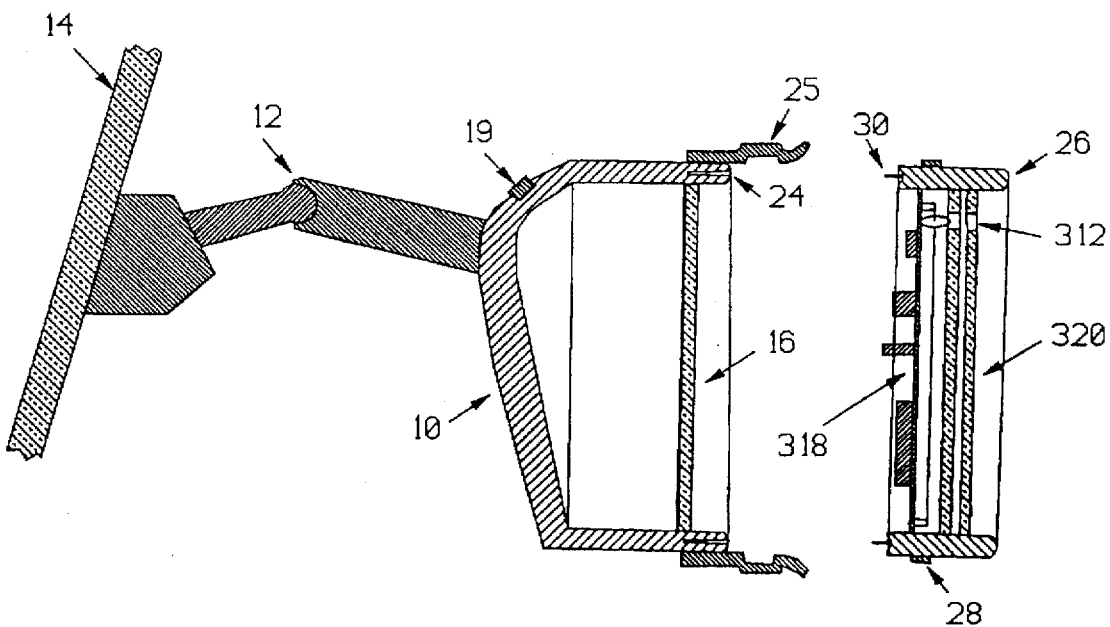
FIG. 3 shows diagramatically a cross-sectional exploded view of a third embodiment according to the invention.

In the embodiment of the invention shown in FIG. 3, those features in common with the embodiment shown in FIG. 2 are given identical reference numbers. The embodiment of FIG. 3 differs however in that the electric circuit 318 is only situated in the removable support frame 26. The automatic electronics of the embodiment shown in FIG. 3 are controlled by a light detection device 312 situated in the removable support frame 26.

In the embodiments shown in FIGS. 2 and 3, the optical cell 220, 320 placed in the removable support frame 26 is of variable luminous reflectivity, such as that described in connection with FIG. 1.

In the electronic scheme shown in FIG. 4, a single light detection device 22 is connected to the control circuit 48 fed with power from the 12 volt electrical system 40 of the vehicle. In response to the detection of light by the light detection device 22, the circuit 48 feeds low-tension via the square wave generator 42 to the high tension transformer 44. All the aforementioned components are found in the housing 10. High tension is fed from the transformer 44 to the optical cell 20 in the removable support frame 26 via the electrical connectors 24, 30.

Figure 5:
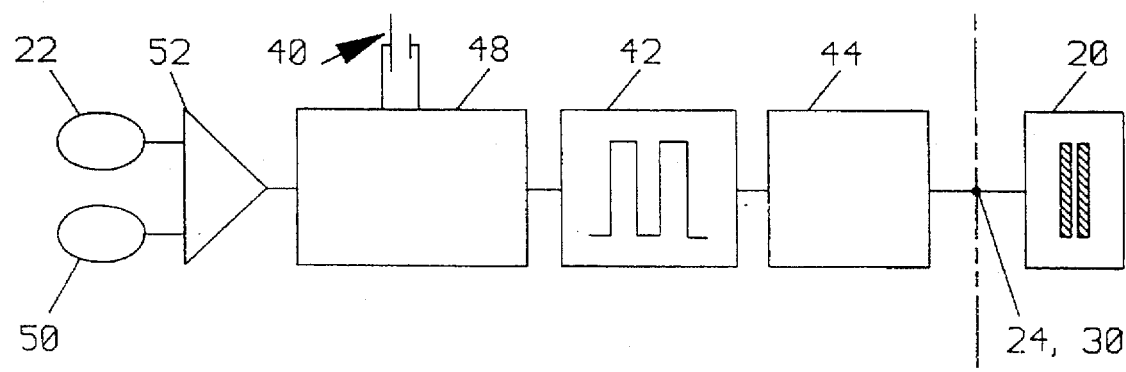
FIGS. 5 to 9 show schematically suitable electronic schemes for alternative rear-view devices according to the invention.

In the modification of the electronic scheme as shown in FIG. 5, two light detection devices 22 and 50 are provided. Light detection device 22 detects dazzle, by capturing light falling on the rear-view device from the rear of the vehicle, while light detection device 50 captures ambient light diffused or deflected by the roof of the vehicle, or the light falling on the rear-view device from the front of the vehicle. The light detection device 50 is for example mounted on the housing 10 of the device on the opposite side thereof to the mirror 16. The two light detection devices 22, 50 are connected to a difference detector 52 which feeds a signal dependant upon the difference in light levels detected by these devices to the control circuit 48.

Figure 6:
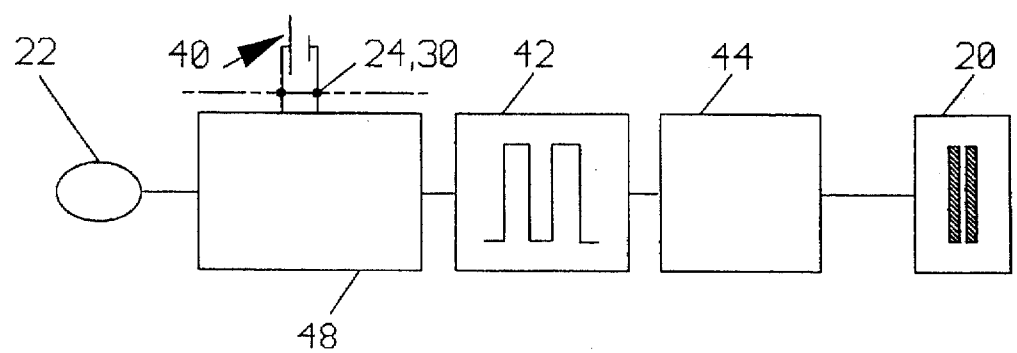
Figure 7:
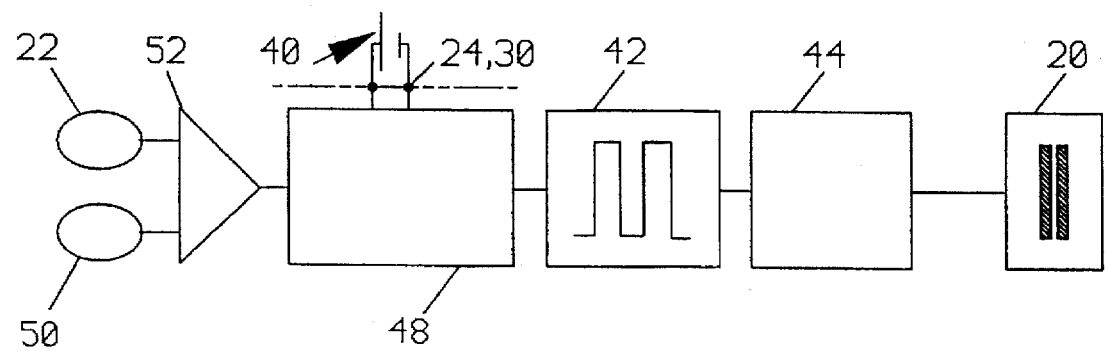

The modifications of the electronic schemes as shown in FIGS. 6 and 7 are suitable for the embodiment of the rear-view device shown in FIG. 3, where the electronic circuit is housed in the removable support frame 26 and the electrical connection to the power supply is completed via the connectors 24, 30. In the case of FIG. 7, the light detection device 50 may be carried on the housing 10 in order to detect, for example, light passing through the windscreen of the vehicle.

Figure 8:
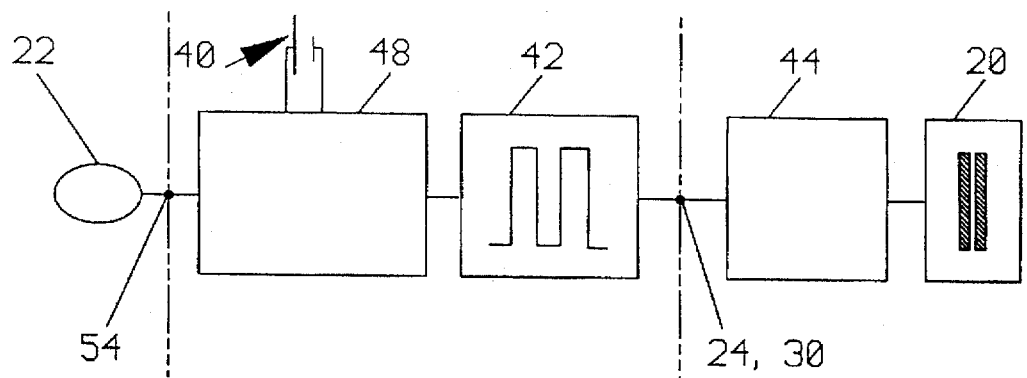
Figure 9:
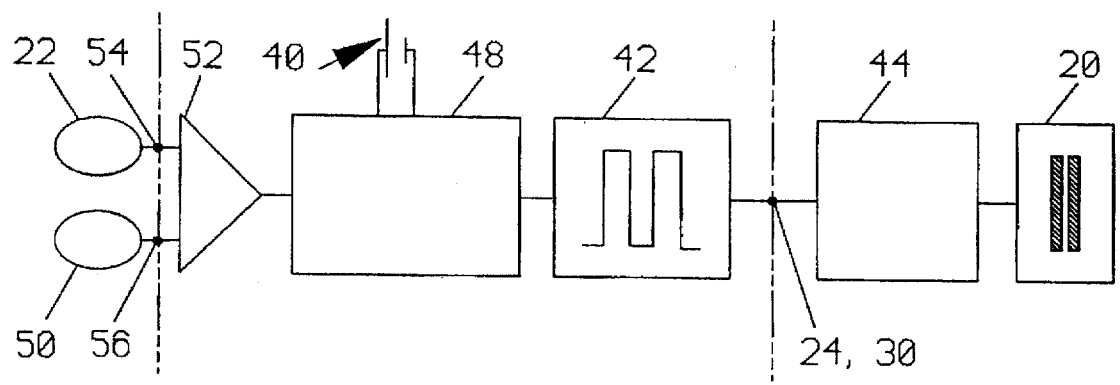

In the modification of the electronic schemes as shown in FIGS. 8 and 9, which schemes are suitable for use with the embodiment of the device shown in FIG. 2, the transformer 44 is carried in the removable support frame 26 and the connection to the signal generator 42 mounted in the housing 10 is effected via the connectors 24, 30. These FIGS. also show that the light detection device 22 or devices 22, 50, may also be mounted on the removable support frame, their connection to the other components of the circuit being by way of an additional connectors 54, or connectors 54, 56. In the case of FIG. 9, the light detection device 22 may be mounted on the removable support 26, while the light detection device 50 may be carried on the housing 10.

As alternatives to the embodiments shown in any one of the figures, the optical cell is formed by electrochromic technology and the electronic circuit is adapted to feed an electrochromic optical cell.

As further alternatives, the optical cell is formed by liquid crystal technology and the electronic circuit is adapted to feed a liquid crystal optical cell.

As still further alternatives, the optical cell is formed by electrodeposition technology and the circuit is adapted to feed an electrodeposition optical cell.

As a yet further alternative, a back-up battery may be provided associated with the electronic circuit, and housed for example in the support frame 26 to provide electrical power for controlling the adjustment of the optical cell in the event of failure of the electrical system of the vehicle.

It is also possible that the support frame 26 is hinged to an upper edge of the housing 10, to enable it to be swung out of the field of vision when necessary.

It is also possible that the support frame 26 is fixed to the housing 10 by vertical or horizontal slides, enabling it to be slid out of the field of vision when necessary.

What is claimed is:

1. A rear-view assembly for a vehicle to provide a user with rearward vision during operation of the vehicle, comprising:
    a mirror;
    a housing which carries the mirror;
    an anti-dazzle adaptor which is comprised of an optical cell having at least one electrically adjustable luminous characteristic selected from the group consisting of transmissivity and reflectivity, and which is movably mounted in front of the mirror in a line of sight between the user and the mirror so that the optical cell is movable out of the line of sight in the event of a malfunction of the optical cell and thereby to return rearward vision to the user via the mirror alone; and
    a support frame which is movable and which carries the optical cell, the housing and the support frame being provided with co-operating releasable securing means to secure the support frame to the housing in a releasable manner.

2. The rear-view assembly according to claim 1, further comprising an electronic circuit for controlling positioning of the optical cell.

3. The rear-view assembly according to claim 2, wherein the electronic circuit for controlling the positioning of the optical cell comprises at least one photo-sensitive optical device which detects incident light falling on the assembly.

4. The rear-view assembly according to claim 3, wherein the electronic circuit for controlling the positioning of the optical cell comprises at least two light detection devices including a first light detection device positioned to receive light coming from the rear of the vehicle and a second light detection device positioned to receive light coming from the front of the vehicle.

5. The rear-view assembly according to claim 2, wherein the electronic circuit for controlling the positioning of the optical cell is manually operable.

6. The rear-view assembly according to claim 5, wherein the electronic circuit for controlling the positioning of the optical cell is manually operable with the aid of one of a regulating potentiometer or a multi-position commutator.

7. The rear-view assembly according to claim 1, wherein the optical cell has the electrically adjustable luminous characteristic of reflectivity.

8. The rear-view assembly according to claim 1, wherein the optical cell includes at least one sheet of glass.

9. The rear-view assembly according to claim 8, wherein the optical cell comprises at least two sheets of glass and a layer of sensitive material sandwiched between two of the at least two sheets of glass.

10. The rear-view assembly according to claim 9, wherein the at least two sheets of glass each have an inwardly directed face, and wherein each of the inwardly directed faces are coated with an electrically conductive material.

11. The rear-view assembly according to claim 8, wherein one face of the at least one sheet of glass is provided with a reflective coating.

12. The rear-view assembly according to claim 1, wherein the optical cell comprises an electrochromic cell.

13. The rear-view assembly according to claim 1, wherein the optical cell comprises a liquid crystal cell.

14. The rear-view assembly according to claim 1, wherein the optical cell comprises a fluid suspension of minute particles which are capable of being oriented within the fluid suspension by an electric field.

15. The rear-view assembly according to claim 2, wherein adjustment of the optical cell allows continuous variation of the luminous characteristics thereof.

16. A rear-view assembly for a vehicle, comprising:
    a mirror;
    an anti-dazzle adaptor which is movably mounted in front of the mirror and which is comprised of an optical cell having at least one electrically adjustable luminous characteristic selected from the group consisting of transmissivity and reflectivity;
    a housing which carries the mirror; and
    a support frame which is movable and which carries the optical cell, the housing and the support frame being provided with co-operating releasable securing means to secure the support frame to the housing in a releasable manner.

17. The rear-view assembly according to claim 16, further comprising co-operating connection means provided on the housing and on the movable support frame to provide electrical connection between the housing and the support frame.

18. The rear-view assembly according to claim 16, further comprising an electronic circuit for controlling positioning of the optical cell, at least part of the electronic circuit being positioned within the housing.

19. The rear-view assembly according to claim 16, further comprising an electronic circuit for controlling positioning of the optical cell, at least part of the electronic circuit being positioned within the support frame.

20. An anti-dazzle adaptor for a rear-view device including a mirror of a vehicle to provide a user with rearward vision during operation of the vehicle, comprising:

an optical cell having at least one electrically adjustable luminous characteristic selected from the group consisting of transmissivity and reflectivity; and means for movably mounting the anti-dazzle adaptor on the rear-view device of the vehicle in front of the mirror including a support frame which is movable, which carries the optical cell, and which is provided with securing means to secure the support frame to the rear-view device of the vehicle in a releasable manner in use and in a line of sight between the user and the mirror so that the optical cell is movable out of the line of sight in the event of a malfunction of the optical cell and thereby to return rearward vision to the user via the mirror alone.

21. The anti-dazzle adaptor according to claim 20, further comprising a support frame which is movable and which carries the optical cell.

22. The anti-dazzle adaptor according to claim 21, further comprising an electronic circuit for controlling positioning of the optical cell, at least a part of the electronic circuit being positioned in the support frame.

23. The anti-dazzle adaptor according to claim 22, wherein the electronic circuit for controlling the positioning of the optical cell comprises at least one photo-sensitive optical device which detects incident light falling on the anti-dazzle adaptor.

24. The anti-dazzle adaptor according to claim 20, wherein the optical cell has the electrically adjustable luminous characteristic of reflectivity.

25. The anti-dazzle adaptor according to claim 20, wherein the optical cell includes at least one sheet of glass.

26. The anti-dazzle adaptor according to claim 25, wherein one face of the at least one sheet of glass is provided with a reflective coating.

27. The anti-dazzle adaptor according to claim 20, wherein the optical cell comprises at least two sheets of glass and a layer of sensitive material sandwiched between two of the at least two sheets of glass.

28. The anti-dazzle adaptor according to claim 27, wherein the at least two sheets of glass each have an inwardly directed face, and wherein each of the inwardly directed faces of the at least two sheets of glass are coated with an electrically conductive material.

29. The anti-dazzle adaptor according to claim 20, wherein the optical cell comprises an electrochromic cell.

30. The anti-dazzle adaptor according to claim 20, wherein the optical cell comprises a liquid crystal cell.

31. The anti-dazzle adaptor according to claim 20, wherein the optical cell comprises a fluid suspension of minute particles which are capable of being oriented within the fluid suspension by an electric field.

32. The anti-dazzle adaptor according to claim 22, wherein the adjustment of the optical cell allows continuous variation of the luminous characteristics thereof.

* * * * *